Aug. 20, 1957 J. J. ZWISLOCKI 2,803,247
EARPLUG
Filed Dec. 2, 1954
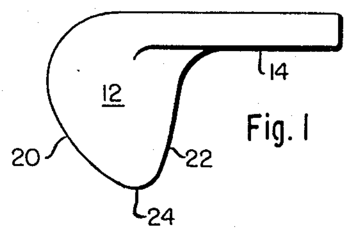
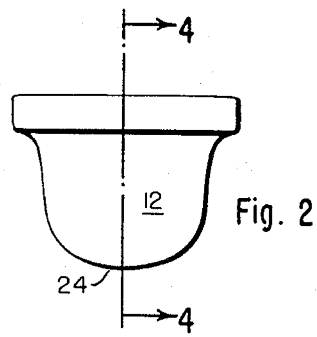
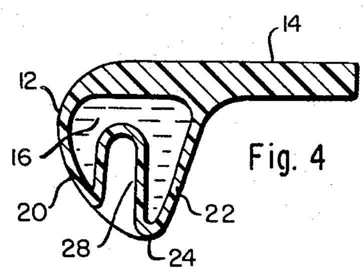
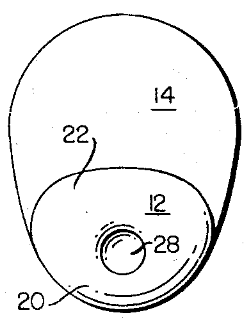
Fig. 3
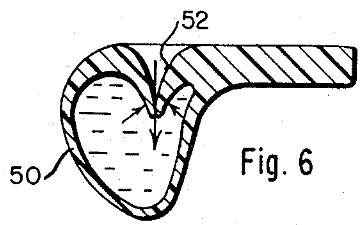
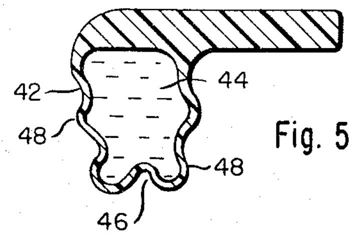
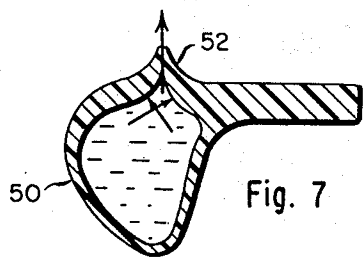
INVENTOR.
JOSEF J. ZWISLOCKI
BY Kenway, Jenney, Witter & Hildreth,
ATTORNEYS United States Patent Office 2,803,247

Patented Aug. 20, 1957

2,803,247

EARPLUG

Josef J. Zwislocki, Cambridge, Mass.

Application December 2, 1954, Serial No. 472,584

9 Claims. (Cl. 128—152)

The present invention relates to earplugs for protection of the ear against noise, dust, and water.

Much effort has been directed toward the development of earplugs that will be effective for protection and still be comfortable and convenient to use. Prior devices have generally been of two types. One general type is the so-called malleable earplug, consisting of a wax or wax-like substance combined with a fibrous or cellular material, while the other type of earplug is elastic or resilient in character, being formed of rubber or synthetic material with rubber-like properties.

The malleable earplugs have the advantage of conforming to the shape and size of the ear canal, they are relatively comfortable, and provide a good sound attenuation when first inserted. However, as a result of the compressions of the ear canal caused by the movements of the lower jaw of the wearer, the effectiveness of the seal decreases considerably after a short time. In addition, the malleable earplugs have a sticky surface which easily accumulates dirt and cannot be washed, with the result that reuse is not practical. Therefore, despite their low price per piece, they are not economical.

The elastic earplugs provide effective attenuation of sound and have the advantage that they can be washed and reused. The elastic earplugs have the serious disadvantage, however, that they are not comfortable. The requirement of effective sound attenuation sets a limit on the yieldability or softness of the material, with the result that the adaptation of the plug to the shape and size of the ear canal is not perfect. A painful pressure on the wall of the ear canal frequently results with this type of earplug, even though a variety of sizes is provided from which to select.

While attempts have been made to combine the advantages of the malleable and the elastic earplugs, by filling a hollow elastic plug with a malleable material, no substantial improvement has been achieved. Instead, it has been found that a hollow elastic earplug filled with a malleable material generally exhibits less shape adaptability than an elastic earplug entirely formed of compressible material. This is due to the fact that changes of shape generally require appreciable changes of volume. Since, in these prior art filled plugs, changes in volume are prevented by the incompressible filling, changes of shape are so restricted that the earplug is incapable of proper adaptation to the ear canal.

It is, therefore, the principal object of the present invention to provide earplugs of novel construction and arrangement, combining the advantages of the malleable and the elastic earplugs so as to provide devices that afford effective protection to the wearer and at the same time are comfortable, sanitary and capable of repeated use.

More specifically, it is an object of the invention to provide earplugs embodying an elastic or resilient envelope with a fill of malleable material, wherein a relatively wide variation in size and configuration may take place so as to conform resiliently with the ear canal at all times.

Still more specifically, it is an object of this invention to provide an earplug wherein the main body consists of a liquid or malleable material within a resilient envelope, the envelope being of a configuration resiliently to permit substantial variation in cross-sectional size and shape of the plug portion so that a single size will serve to fit practically all ear canals.

It is another object of this invention to provide deformable elastic earplugs shaped in such a way that they can be effectively retained in the ear canal without requiring the use of flanges or other special means. Flanges are undesirable because they prevent full contact between the earplug and the walls of the ear canal, and thus decrease the effectiveness of the sound attenuation.

It is further an object of this invention to provide an earplug having a hollow elastic envelope filled with a substance of high internal viscosity, that is effective to provide a high degree of sound attenuation, with the elastic envelope serving to maintain proper resilient coupling of the viscous mass with the ear canal.

It is another object of this invention to provide an earplug comprising a hollow elastic envelope filled with a fluid or semi-fluid material, the envelope being provided with a valve permitting the amount of the fill readily to be changed.

Fig. 1 is a view in side elevation of a preferred form of earplug embodying the invention.

Fig. 2 is a view of said plug from the right side of Fig. 1.

Fig. 3 is a view corresponding to the underside of Fig. 2.

Fig. 4 is a sectional elevation taken on the line 4—4 of Fig. 2.

Fig. 5 is a sectional elevation, taken similarly to Fig. 4, of a modified form of earplug embodying the invention.

Figs. 6 and 7 are similarly taken sectional views of still another modification of the earplug of the invention.

The earplug according to the preferred embodiment shown in Figs. 1–4 comprises a body portion 12 and an integral tab or flange 14 which prevents the body from being inserted too deeply into the ear canal. The tab 14 likewise permits the plug conveniently to be removed when desired.

As has been previously indicated, the body portion of the earplug consists of a hollow envelope with a fill of a viscous liquid material 16. The envelope, which is preferably relatively thin-walled in the body region and somewhat thicker in the outer portions of body and tab 14, is formed of a resilient rubber or rubber-like plastic material. The envelope may conveniently be formed by molding, in accordance with known techniques.

The body is preferably of a somewhat asymmetrical shape having a cross-section that approximates the shape of the average ear canal. The cross-sectional shape of the body may be seen in Fig. 3, wherein the roughly elliptical contour of the body is seen in outline. The body is somewhat more curved in the outer region 20 away from the tab than in the region 22 beneath the tab.

The body of the plug likewise is somewhat asymmetric in elevation, though generally of pear-shaped configuration as shown in Figs. 1 and 4. Here again the surface 20 is relatively more convex than surface 22, while the body tapers to a rounded apex 24. This shape, established by careful investigations and measurements, has been found to permit effective sealing, a high degree of comfort, and proper retention in the ear canal, when utilized in conjunction with the novel means to be described by which volumetric changes may be accommodated.

To permit the employment of a viscous or wax like fill of material having a high degree of effectiveness as an acoustic barrier, such as a soft wax, a gel, or a semi-liquid plastic material such as a silicone resin sometimes termed "bouncing putty," the resilient envelope is formed with a reentrant portion 28 disposed approximately centrally of the body and extending in a generally axial direction of the plug. This reentrant portion, of resilient elastic material like the envelope, permits substantial variation in cross-sectional size and shape of the body of the plug, the reentrant portion providing, in effect, a region into which the wax or viscous fill can expand within the envelope when the size of the plug is reduced. By reason of the resilient elastic character of the envelope, the envelope, including the reentrant portion, tends to resume its normal shape as initially molded, so that a slight but relatively constant pressure is exerted on the viscous fill to cause the envelope yieldingly to conform to the ear canal. The thin-walled envelope effectively couples the mass of the viscous material to the walls of the canal for maximum effectiveness of sound attenuation.

An alternative construction embodying the general principle of the reentrant envelope portion is illustrated in Fig. 5. In this embodiment the envelope 42 enclosing the viscous fill 44 has a generally corrugated or ribbed configuration in addition to the reentrant portion 46. This wave-like or rubbed contour, indicated generally at 48, provides a resiliency in shape and volume so that the plug may adapt itself to the ear canal even though filled with a sound-absorbing liquid or semi-liquid material. The wave-like contour aids in retaining the plug in the ear. As in the embodiment of Figs. 1–4, the cross-section of the body portion is preferably oval or elliptical, while longitudinally the body in its general configuration tapers slightly toward the inner end.

A further illustrative embodiment of the invention is shown in Figs. 6 and 7 wherein the body portion 50, of the same general shape as that shown in Figs. 1–4, is provided with a reentrant portion 52 extending inwardly from the outer wall of the device. This reentrant portion not only serves to accommodate volume changes as the cross-section of the body is varied, but it also serves as a valve to permit convenient additions and withdrawal of the viscous liquid fill. To this end, the reentrant portion 52 is not sealed closed, but is in the form of a self-sealing passage which remains resiliently closed under the action of the elastic walls of the envelope. Fig. 6 illustrates the manner in which liquid or semi-liquid material may be introduced into the envelope through a needle, while Fig. 7 shows the reentrant portion reversed as a result of pressure applied to the body, permitting a portion of the fill to escape through the passage as may be desired.

As in the case of the embodiment of Figs. 6 and 7, the wax or liquid fill may be introduced into the hollow envelope by means of a hypodermic needle through the walls of the envelope. The elastic properties of the plastic material of the envelope are such that a sufficient seal is afforded when the needle is withdrawn, so as to retain the fill within. In general, however, a slight seepage is not objectionable as it will serve to maintain a very slight film of the fill as a lubricant on the surface of the earplug, so as to minimize skin irritations.

While the invention has been described and illustrated as embodied in certain specific examples of viscous-fill earplugs the envelopes of which have reentrant portions for volume and shape accommodation, it is to be understood that the invention is not so limited and comprehends other forms and configurations within the terms of the appended claims.

I claim as my invention:

1. An ear plug comprising a hollow body of resilient material and a mass of deformable material within said body, said deformable material having a viscosity substantially greater than air, said body having a reentrant wall portion to enable the body and deformable material to fit yieldingly within the ear canal.

2. An earplug comprising a hollow body of resilient material adapted to fit within the ear canal, a mass of deformable material within said body, said deformable material having a viscosity substantially greater than air, said body having a concave wall portion capable of deformation to permit changes of cross-sectional size and shape of the body and deformable material.

3. An earplug comprising a hollow body of resilient material adapted to fit within the ear canal, a mass of deformable material within said body, said deformable material having a viscosity substantially greater than air, said body having a reentrant wall portion extending into and surrounded by the deformable material substantially along the axis of the body.

4. An earplug according to claim 3 wherein the reentrant wall portion has a resiliently sealed aperture therein to permit the introduction and withdrawal of deformable material therethrough.

5. An ear plug comprising a hollow body of resilient material and a mass of deformable material within said body, said deformable material having a viscosity substantially greater than air, the body having in a wall thereof a valve through which deformable material may be supplied to and withdrawn from the body.

6. An ear plug comprising a hollow body of resilient material and a mass of deformable viscous material within said body, the body having a configuration to form a plug adapted to be inserted in the ear canal, the body being approximately elliptical in cross section and tapering from the outer end toward the inner end, the body having a reentrant wall portion directed approximately axially of the body.

7. An earplug comprising a hollow body of resilient material and a mass of deformable viscous material within said body, the body being thin-walled and having a sinuous contour longitudinally of the body and a reentrant wall portion at the end thereof, to provide resilient yielding contact between the sides of the plug and the wall of the ear canal.

8. An earplug comprising a hollow body of resilient material and a mass of deformable viscous material within said body, the body being thin-walled and having a configuration approximately elliptical in cross-section and tapering toward the inner end, the elliptical cross-section being somewhat asymmetric with the longitudinal contour of the body curving convexly along one wall portion and with relatively less curvature along the opposite wall portion, the body having a reentrant wall portion to permit changes in size and shape of the body within the ear canal.

9. An earplug comprising a hollow body of resilient material and a mass of deformable viscous material within the body, the body having an integral flange portion extending laterally from the outer end of the body and adapted to remain outside the ear canal when the body is inserted within the canal, the body having a generally elliptical cross section and tapering from the outer to the inner end, the cross-section being somewhat asymmetric with the body tapering in a convexly curved longitudinal contour in the wall portion opposite the flange, and tapering along a relatively straighter contour along the wall portion adjacent the lateral flange, the body having a reentrant wall portion to accommodate changes in size and shape of the body within the ear canal.

References Cited in the file of this patent

UNITED STATES PATENTS 1,406,425 Stair ------------------ Feb. 14, 1922